United States Patent
Sone et al.

(10) Patent No.: US 8,545,337 B2
(45) Date of Patent: Oct. 1, 2013

(54) FIXED UNIFORM-MOTION UNIVERSAL JOINT

(75) Inventors: Keisuke Sone, Iwata (JP); Hirokazu Ooba, Iwata (JP); Kazuhiko Yoshida, Iwata (JP); Kiyohiro Itou, Iwata (JP)

(73) Assignee: NTN Corporation, Osaka (JP)

( * ) Notice: Subject to any disclaimer, the term of this patent is extended or adjusted under 35 U.S.C. 154(b) by 46 days.

(21) Appl. No.: 12/991,480

(22) PCT Filed: May 28, 2009

(86) PCT No.: PCT/JP2009/059745
§ 371 (c)(1),
(2), (4) Date: Nov. 8, 2010

(87) PCT Pub. No.: WO2009/150942
PCT Pub. Date: Dec. 17, 2009

(65) Prior Publication Data
US 2011/0065519 A1    Mar. 17, 2011

(30) Foreign Application Priority Data
Jun. 13, 2008   (JP) .................................. 2008-155865

(51) Int. Cl.
*F16D 3/2237*   (2011.01)

(52) U.S. Cl.
USPC .......................................... 464/145; 464/906

(58) Field of Classification Search
USPC .................... 464/144, 145, 146, 906
See application file for complete search history.

(56) References Cited

U.S. PATENT DOCUMENTS

| 4,698,047 A | 10/1987 | Welschof et al. |
| 6,120,382 A | 9/2000 | Sone et al. |
| 6,383,082 B1 | 5/2002 | Déclas |

(Continued)

FOREIGN PATENT DOCUMENTS

| EP | 0 802 341 | 10/1997 |
| EP | 1 512 879 | 3/2005 |

(Continued)

OTHER PUBLICATIONS

International Preliminary Report on Patentability and Written Opinion of the International Searching Authority issued Jan. 20, 2011 in International (PCT) Application No. PCT/JP2009/059745.

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A fixed type constant velocity universal joint of an eight-ball undercut-free type has improved torque capacity at high operating angle while ensuring durability at low operating angle. Centers of a track groove (32) of an outer joint member and a track groove (35) of an inner joint member are respectively separated from a center plane (P) toward axially different sides, and are offset away from a joint center axis (X) to a radially opposite side relative to grooves (35). When Rt represents a distance between a center of a ball (37) and the center of groove (32), and F represents an axial distance between plane (P) and the center of groove (32), a ratio R1 between F and Rt is $0.061 \leq R1 \leq 0.087$. When fr represents a radial offset amount as a distance between axis (X) and the center of groove (32), a ratio R3 between fr and Rt is $0.07 \leq R3 \leq 0.19$.

11 Claims, 9 Drawing Sheets

(56) References Cited

U.S. PATENT DOCUMENTS

| | | |
|---|---|---|
| 2003/0017877 A1 | 1/2003 | Kobayashi et al. |
| 2005/0079918 A1 | 4/2005 | Kobayashi et al. |
| 2005/0261067 A1 | 11/2005 | Kobayashi et al. |
| 2005/0272510 A1 | 12/2005 | Nakagawa et al. |
| 2010/0062865 A1* | 3/2010 | Hoshino et al. ............... 464/145 |

FOREIGN PATENT DOCUMENTS

| | | |
|---|---|---|
| JP | 59-106724 | 6/1984 |
| JP | 04-228925 | 8/1992 |
| JP | 08-128454 | 5/1996 |
| JP | 9-317783 | 12/1997 |
| JP | 2001-097063 | 4/2001 |
| JP | 2002-541395 | 12/2002 |
| JP | 2007-270997 | 10/2007 |
| WO | 97/24538 | 7/1997 |

OTHER PUBLICATIONS

Supplementary Partial European Search Report issued Mar. 23, 2012 in corresponding European Patent Application No. 09762372.2.

International Search Report issued Sep. 8, 2009 in International (PCT) Application No. PCT/JP2009/059745.

* cited by examiner

FIXED UNIFORM-MOTION UNIVERSAL JOINT

TECHNICAL FIELD

The present invention relates to a fixed type constant velocity universal joint, and more particularly, to a fixed type constant velocity universal joint of a type allowing only angular displacement between two articulated shafts on a drive side and a driven side, and also of an undercut-free type that is provided with eight torque transmission balls and is used for power transmission systems of automobiles and other various industrial machines.

BACKGROUND ART

The fixed type constant velocity universal joint includes a Rzeppa type (BJ) (Patent Literature 1, for example) and an undercut-free type (UJ).

As illustrated in FIG. 13, the fixed type constant velocity universal joint of the Rzeppa type includes: an outer race 3 serving as an outer joint member and having an inner spherical surface 1 in which a plurality of track grooves 2 are equiangularly formed along an axial direction; an inner race 6 serving as an inner joint member and having an outer spherical surface 4 in which a plurality of track grooves 5 are equiangularly formed in pairs with the track grooves 2 of the outer race 3 along the axial direction; a plurality of balls 7 interposed between the track grooves 2 of the outer race 3 and the track grooves 5 of the inner race 6, for transmitting torque; and a cage 8 interposed between the inner spherical surface 1 of the outer race 3 and the outer spherical surface 4 of the inner race 6, for retaining the balls 7. In the cage 8, a plurality of window portions 9 for accommodating the balls 7 are arranged along a circumferential direction.

The cage 8 is held in spherical surface contact with the inner spherical surface of the outer race 3 and the outer spherical surface of the inner race 6. A center of curvature (O2) of a ball center trace line of each of the track grooves 2 of the outer race 3 and a center curvature (O1) of a ball center trace line of each of the track grooves 5 of the inner race 6 are situated symmetrically with respect to a joint center Oj. In other words, the center curvature O1 and the center curvature O2 are offset from the joint center Oj in opposite directions by an equal distance in the axial direction. That is, each of the track grooves 2 of the outer race 3 is offset from the joint center Oj to a joint-opening side by a predetermined distance along a joint center axis X, and each of the track grooves 5 of the inner race 6 is offset from the joint center Oj to a joint-deep-portion side by a predetermined distance along the joint center axis X. Here, the joint center axis X is referred to as a straight line including an axis of the outer race 3 and an axis of the inner race 6 under a state in which an operating angle of the joint is 0°. A joint center plane is referred to as a plane including a center of each of the torque transmission balls 7 and being orthogonal to the joint center axis. The joint center Oj is referred to as an intersection between the joint center plane and the joint center axis.

Therefore, torque-transmission-ball tracks formed by the track grooves 2 of the outer race 3 and the track grooves 5 of the inner race 6 exhibit wedge shapes gradually expanding from one side in the axial direction to the other side. The balls 7 are respectively accommodated in the torque-transmission-ball tracks having the wedge shapes, to thereby transmit torque between the outer race 3 and the inner race 6. In order to retain all of the balls 7 in a joint plane (plane perpendicular to a bisector of an operating angle), the cage 8 is incorporated.

Further, as the fixed type constant velocity universal joint of the Rzeppa type, one having a structure provided with six torque transmission balls has been used as a technical standard for years and supported by many users in aspects of performance, reliability, and the like. However, the applicant of the present invention has developed and already proposed an eight-ball Rzeppa type which is made highly efficient and fundamentally lightweight and compact while ensuring strength, load capacity, and durability equal to or higher than those of a six-ball Rzeppa type as the technical standard (for example, Patent Literature 1 below).

Next, as illustrated in FIG. 14, a fixed type constant velocity universal joint of a UJ type includes: an outer race 13 serving as an outer joint member and having a radially inner surface 11 in which a plurality of track grooves 12 are equiangularly formed along the axial direction; an inner race 16 serving as an inner joint member and having a radially outer surface 14 in which a plurality of track grooves 15 are equiangularly formed in pairs with the track grooves 12 of the outer race 13 along the axial direction; a plurality of balls 17 interposed between the track grooves 12 of the outer race 13 and the track grooves 15 of the inner race 16, for transmitting torque; and a cage 18 interposed between the radially inner surface 11 of the outer race 13 and the radially outer surface 14 of the inner race 16, for retaining the balls 17. In the cage 18, a plurality of window portions 19 for accommodating the balls 17 are arranged along the circumferential direction.

In this case, each of the track grooves 12 of the outer race 13 includes a deep-side track groove 12a in which a ball center trace line in the track groove is drawn as an arc-shaped portion, and an opening-side track groove 12b in which a ball center trace line in the track groove is drawn as a straight portion parallel to an axis of the outer race. A center curvature O2 of the deep-side track groove 12a is offset from the joint center Oj to an opening side of the outer race 13 in the axial direction. Further, each of the track grooves 15 of the inner race 16 includes a deep-side track groove 15a in which a ball center trace line in the track groove is drawn as a straight portion parallel to an axis of the inner race, and an opening-side track groove 15b in which a ball center trace line in the track groove is drawn as an arc-shaped portion. A center curvature O1 of the opening-side track groove 15b is offset from the joint center Oj to an axially opposite side (i.e., deep side) relative to the center curvature O2 of the deep-side track groove 12a of the outer race 13 by an equal distance F.

As described above, in contrast to the Rzeppa type in which an entire track is formed into an arc-shape, a track of the outer race 13 of the UJ type is formed into an undercut-free shape having a straight opening side. Therefore, in comparison with the BJ type, ball positions are situated on a radially outer side at an opening portion, and hence an interference angle between a shaft (shaft to be fitted to the inner race) and the track groove 12 of the outer race 13 is increased. As a result, the UJ type can take a higher operating angle than the BJ type. Further, the track of the outer race 13 of the UJ type is formed into a straight shape on the opening side, and hence a radial movement amount of the balls 17 is increased to the radially outer side. Along with the increase, an outer diameter of the cage 18 is increased for retaining the balls 17. Consequently, a diameter of an inner spherical surface of the outer race 13 is increased.

However, in the UJ type, through increasing the radially inner surface (inner spherical surface) of the outer race 13, the arc-shaped track grooves of the outer race 13 are offset to the opening side, and hence a track depth on the deep side is shallow. Thus, as described above, when the inner spherical surface of the outer race 13 is increased, the track groove depth on the deep side becomes shallower. Here, the track depth is referred to as a distance between a spherical surface and a ball contact point at which a contact ellipse of the ball is closest to the spherical surface when analysis of a joint internal force is performed in a rotating state, the ball moving in the track during one rotation in the axial direction and a contact angle direction.

Further, in view of retaining the balls 7, 17 by the cage 8, 18 and ensuring the track depth, in a case of the same size, the UJ type is larger than the Rzeppa type in ball diameter and pitch circle PCD, and even in outer diameter of the outer race.

The UJ type illustrated in FIG. 14 has a cage offset shape effective in ensuring the track depth on the deep side of the outer race. That is, from the joint center Oj, a center O4 of an outer spherical surface 18a of the cage 18 is offset to an opening side in the axial direction by fc, and a center O3 of an inner spherical surface 18b of the cage 18 is offset to a deep side in the axial direction by fc. Such a cage offset type joint is referred to as a track-direction cage offset type.

In recent years, there has been proposed a joint of an eight-ball UJ type having an outer diameter smaller than that of a six-ball type (Patent Literature 1). The joint of the eight-ball UJ type has a ball diameter smaller than that of the six-ball type. Thus, in order to ensure a radial dimension (thickness) of the cage corresponding to the radial movement amount of the balls determined by PCR and an offset amount irrespective of the size and number of the balls, the offset amount is set to be small, and as illustrated in FIG. 14, cage offset is adopted. Here, PCR is referred to as a length of a line connecting between the center of the ball and an arc center of the track groove of the outer race or an arc center of the track groove of the inner race.

For the eight-ball UJ type described above, an improvement at the time of high angle is important for further improvement of durability.

By the way, conventionally, there has been disclosed a six-ball Rzeppa type, in which a center of the track groove is offset to be positioned away from the joint center axis to a radially opposite side relative to the track groove (Patent Literature 2, Patent Literature 3, and Patent Literature 4).

In Patent Literature 2, the track groove of the outer race includes an opening-side first guide groove having a center corresponding to the joint center, and a deep-side second guide groove having a center offset from the joint center to the radially opposite side. Further, the track groove of the inner race includes a deep-side second track groove having a center offset from the joint center to the deep side along the joint center axis, and an opening-side second guide groove having a center offset from the center of the deep-side second guide groove further to the radially opposite side.

With this configuration, a groove depth of a deep-side first guide groove of the outer race is increased. Further, a thickness of the inner race is increased in the opening-side second guide groove of the inner race. Therefore, when the joint takes a high operating angle, there is eliminated a chip of an edge portion of the groove caused when the ball climbs onto the deep-side first guide groove of the outer race. Further, there is eliminated damage of the inner race caused by the load applied from the ball.

In Patent Literature 3, the center of the track groove of the outer race and the center of the track groove of the inner race are separated from a diameter-direction plane (joint center plane) respectively to both sides in the axial direction by an equal distance, and are offset to be positioned away from the joint center axis to the radially opposite side by a predetermined amount. With this configuration, under a state in which the joint takes the maximum operating angle and the ball is extremely close to an inlet edge portion of the track groove of the outer race, a contact force between the ball and the track groove is reduced. Consequently, damage of the inlet edge portion of the track groove is prevented.

In Patent Literature 4, a center curvature of a groove center line of the track groove of the outer race and a center curvature of a groove center line of the track groove of the inner race are set to be eccentric to both sides of the joint center plane, and to be situated on opposites sides beyond a shaft center on a plane including the groove center line and the shaft center. With this configuration, it is possible to increase the maximum allowable angle for the joint angle, and to ensure strength without increasing the outer diameter of the outer race.

Further, conventionally, there has been disclosed a joint capable of increasing a maximum articulation angle without influencing running characteristics, etc. (Patent Literature 5). That is, in Patent Literature 5, a distance between a base of a running track and an axis of rotation of the joint starts from a point of the maximum value, and an angle of intersection formed between a tangent line of a trace curve and the axis of rotation of the joint increases monotonously.

CITATION LIST

Patent Literature

Patent Literature 1: JP 09-317783 A
Patent Literature 2: JP 04-228925 A
Patent Literature 3: JP 2002-541395 A
Patent Literature 4: JP 08-128454 A
Patent Literature 5: JP 59-106724 A

SUMMARY OF INVENTION

Technical Problem

In a constant velocity universal joint of the Rzeppa type, when an axial offset amount of a center of a track groove (axial distance between the center of the track groove and a joint center plane) is reduced or when a radial offset amount (radial distance between the center of the track groove and a joint center axis) is provided, a peak value of track load during rotation of the joint (load acting on a contact portion between the torque transmission ball and the track groove) tends to increase. In the six-ball Rzeppa type joint disclosed in Patent Literatures 2 and 3, radial offset is provided to the center of the track groove. However, this is provided in consideration of preventing damage to a side wall portion of the track groove in a range at a maximum operating angle or a high operating angle approximate thereto. Thus, an object to ensure durability in the range at a low operating angle or the range at an intermediate operating angle is not taken into consideration at all.

In particular, each of the joints described in Patent Literatures 2 to 4 includes six balls, and each of the track grooves is constituted by a single arc-shaped portion. Further, the joint described in Patent Literature 5 includes six balls, and each of the track grooves does not include a straight portion. Thus, conventionally, the constant velocity universal joint of the eight-ball UJ type does not include a joint capable of achieving an improvement of torque capacity at a high operating angle while ensuring durability at the time of a low operating angle.

It is an object of the present invention to provide a fixed type constant velocity universal joint of an eight-ball undercut-free type, which is capable of achieving an improvement of torque capacity at a high operating angle while ensuring durability at the time of a low operating angle.

Solution to the Problem

A first fixed type constant velocity universal joint according to the present invention includes: an outer joint member having a radially inner surface in which eight track grooves extending in an axial direction are formed; an inner joint member having a radially outer surface in which eight track grooves extending in the axial direction are formed; eight torque-transmission-ball tracks formed by incorporation of the track grooves of the outer joint member and the track grooves of the inner joint member corresponding to the track grooves of the outer joint member; eight torque transmission balls arranged in the torque-transmission-ball tracks, respectively; and a cage including pockets for retaining the torque transmission balls, the fixed type constant velocity universal joint being of an undercut-free type including a curved portion and a straight portion which are both provided on a bottom surface of each of the track grooves of the outer joint member and a bottom surface of each of the track grooves of the inner joint member, in which: under a state in which an operating angle of the joint is 0°, when a straight line including an axis of the outer joint member and an axis of the inner joint member is referred to as a joint center axis and a plane including a center of each of the torque transmission balls and being orthogonal to the joint center axis is referred to as a joint center plane, a center of each of the track grooves of the outer joint member and a center of each of the track grooves of the inner joint member are separated from the joint center plane respectively to both sides in the axial direction, and are offset to be positioned away from the joint center axis to a radially opposite side relative to the track grooves, and a center of an outer spherical surface of the cage and a center of an inner spherical surface of the cage correspond to each other; and when Rt represents a distance between the center of each of the torque transmission balls and the center of each of the track grooves of the outer joint member or the center of each of the track grooves of the inner joint member, and F represents an axial distance between the joint center plane and the center of each of the track grooves of the outer joint member or the center of each of the track grooves of the inner joint member, a ratio R1 (=F/Rt) between F and Rt is set to satisfy $0.061 \leq R1 \leq 0.087$, and, when fr represents a radial offset amount as a distance between the joint center axis and the center of each of the track grooves of the outer joint member or the center of each of the track grooves of the inner joint member, a ratio R3 (=fr/Rt) between fr and Rt is set to satisfy $0.07 \leq R3 \leq 0.19$.

Further, a second fixed type constant velocity universal joint according to the present invention includes: an outer joint member having a radially inner surface in which eight track grooves extending in an axial direction are formed; an inner joint member having a radially outer surface in which eight track grooves extending in the axial direction are formed; eight torque-transmission-ball tracks formed by incorporation of the track grooves of the outer joint member and the track grooves of the inner joint member corresponding to the track grooves of the outer joint member; eight torque transmission balls arranged in the torque-transmission-ball tracks, respectively; and a cage including pockets for retaining the torque transmission balls, the fixed type constant velocity universal joint being of an undercut-free type including a curved portion and a straight portion which are both provided on a bottom surface of each of the track grooves of the outer joint member and a bottom surface of each of the track grooves of the inner joint member, in which: under a state in which an operating angle of the joint is 0°, when a straight line including an axis of the outer joint member and an axis of the inner joint member is referred to as a joint center axis and a plane including a center of each of the torque transmission balls and being orthogonal to the joint center axis is referred to as a joint center plane, a center of each of the track grooves of the outer joint member and a center of each of the track grooves of the inner joint member are separated from the joint center plane respectively to both sides in the axial direction, and are offset to be positioned away from the joint center axis to a radially opposite side relative to the track grooves; when a center of an outer spherical surface of the cage is arranged on the center side of the track groove of the inner joint member relative to the joint center and a center of an inner spherical surface of the cage is arranged on the center side of the track groove of the outer joint member relative to the joint center, and when fc represents an axial distance between the joint center plane and the center of the outer spherical surface of the cage or the center of the inner spherical surface of the cage and R represents a distance between the center of each of the torque transmission balls and the joint center axis, a ratio R2 (=fc/R) between fc and R is set to be 0.01 or less; and when Rt represents a distance between the center of each of the torque transmission balls and the center of each of the track grooves of the outer joint member or the center of each of the track grooves of the inner joint member, and F represents an axial distance between the joint center plane and the center of each of the track grooves of the outer joint member or the center of each of the track grooves of the inner joint member, a ratio R1 (=F/Rt) between F and Rt is set to satisfy $0.044 \leq R1 \leq 0.087$, and, when fr represents a radial offset amount as a distance between the joint center axis and the center of each of the track grooves of the outer joint member or the center of each of the track grooves of the inner joint member, a ratio R3 (=fr/Rt) between fr and Rt is set to satisfy $0.07 \leq R3 \leq 0.19$.

At the normal angle (operating angle 6°), as the value of R1 becomes smaller, the track depth becomes deeper. Further, as the value of R3 becomes smaller, the track depth becomes deeper. Here, the track depth is referred to as a distance between a spherical surface and a ball contact point at which a contact ellipse of the ball is closest to the spherical surface when analysis of the joint internal force is performed in a rotating state, the ball moving in the track during one rotation in the axial direction and the contact angle direction. As the distance between the ball contact point and the spherical surface portion is increased, the durability is improved.

Owing to provision of radial offset at the center (center curvature of the curved portion) of the track groove of the outer joint member, when compared to a case where the radial offset is not provided, the groove depth on the joint-deep-portion side of the track groove is relatively increased. Thus, rigidity of a side wall portion of the joint deep portion of the track groove is increased. Accordingly, when the joint takes a high operating angle and the torque transmission ball transmits torque at a position close to the joint-deep-portion side of the track groove, deformation of an edge portion of the side wall portion of the joint deep portion of the track groove is suppressed, and hence torsional strength of the joint in a high operating angle range is increased. Further, torque capacity in the high operating angle range is increased, and edge load is reduced in the side wall portion of the joint deep portion of the track groove. As a result, the durability of the joint in the high operating angle range is improved. Here, the torque capacity is referred to as torque in which an edge portion of the contact ellipse serving as a contact portion between the torque transmission ball and the track groove overlaps an edge line of the track groove when the joint transmits torque while taking a certain operating angle.

Further, R2 is set to be 0.01 or less. As a result, it is possible to prevent a reduction in thickness on an opening side of the cage. As the value of R1 becomes smaller, a PV value (obtained by multiplying sliding speed between the ball and the track by track load) becomes smaller. As the PV value becomes smaller, durability is improved.

In the fixed type constant velocity universal joint, it is preferred that the curved portion of the bottom surface of each of the track grooves of the outer joint member be formed by a single arc, and the curved portion of each of the track grooves of the inner joint member be formed by a single arc. This is because processing is easy and manufacturing cost is reduced. Further, it is preferred that the ratio R1 (=F/Rt) between F and Rt be set to be 0.071 or less, and it is preferred that the ratio R3 (=fr/Rt) between fr and Rt be set to be 0.15 or more.

The constant velocity universal joint is used in, for example, articulating a drive shaft of an automobile.

Advantageous Effects of Invention

According to the present invention, the torque capacity on the deep side of the outer race is increased at the time of high operating angle. Thus, rigidity of a wall surface of the track groove is increased, deformation of the edge portion of the track is suppressed, and the torsional strength is increased. The track depth on the deep side of the outer race is increased at the time of high operating angle. Thus, climbing torque is increased, the edge load is reduced, and the durability at thehighoperatingangle is improved. At the normal angle (operating angle 6°), the track depth with a size equivalent to that of the conventional product can be ensured, and the durability is equivalent to or more than that of the conventional product. In particular, when R1 is equal to or less than 0.071, the track depth becomes deeper, and the PV value is also reduced. As a result, the durability is improved. As described above, the fixed type constant velocity universal joint can meet demand for high durability, and hence it is possible to achieve a reduction in size, weight, and cost. Further, when R1 is equal to or less than 0.087 to be smaller than a value of the conventional product, load in the axial direction from the ball to the cage, and a radial movement amount of the ball are reduced, for example. Accordingly, efficiency in torque transmission is improved.

DESCRIPTION OF EMBODIMENTS

In the following, embodiments of the present invention are described with reference to the drawings.

Figure 1:
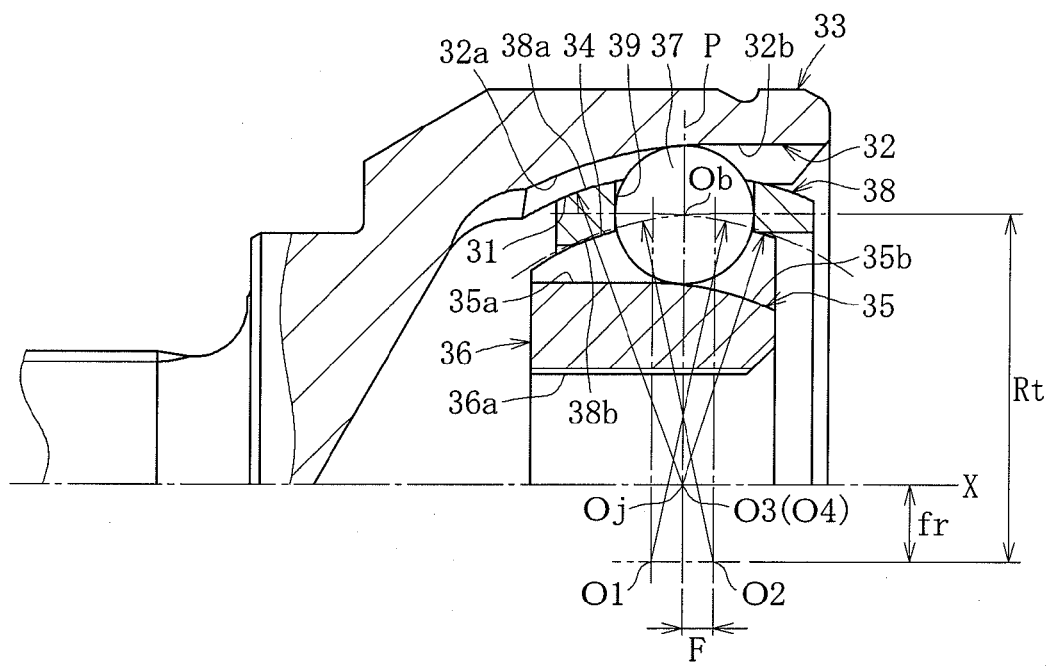
FIG. 1 is a sectional view of a fixed type constant velocity universal joint according to a first embodiment of the present invention.
Figure 2:
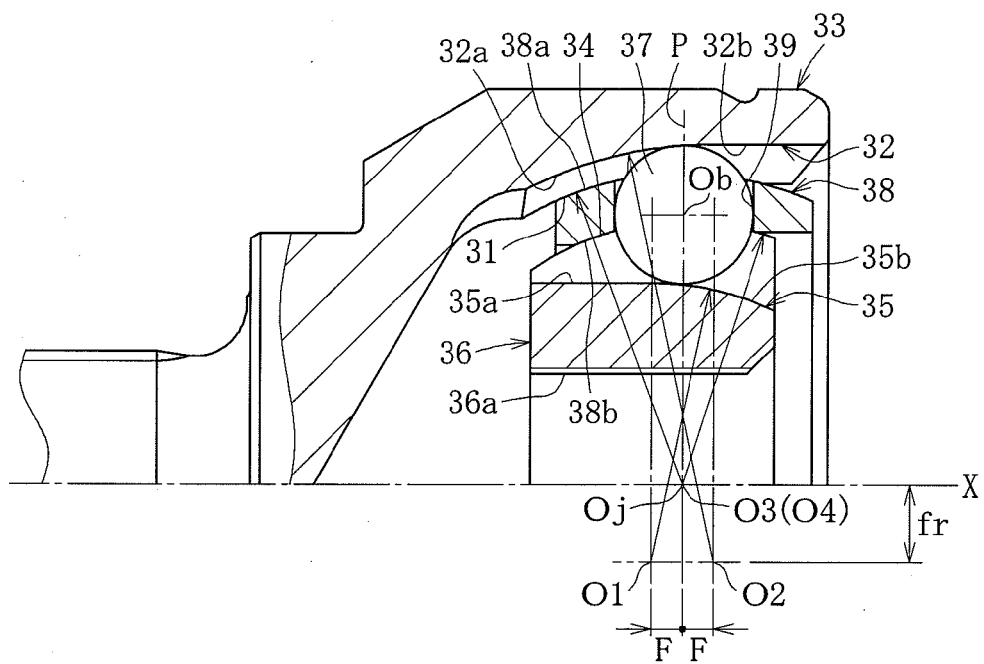
FIG. 2 is a sectional view of the fixed type constant velocity universal joint.

A fixed type constant velocity universal joint according to this embodiment is arranged, for example, on a fixed side (wheel side) of a drive shaft of an automobile. As illustrated in FIG. 1 and FIG. 2, the fixed type constant velocity universal joint includes: an outer race 33 serving as an outer joint member and having a radially inner surface 31 in which a plurality of (eight) track grooves 32 are equiangularly formed along an axial direction; an inner race 36 serving as an inner joint member and having a radially outer surface 34 in which a plurality of (eight) track grooves 35 are equiangularly formed in pairs with the track grooves 32 of the outer race 33 along the axial direction; eight torque transmission balls 37 respectively arranged in eight ball tracks formed by incorporation of the track grooves 32 of the outer race 33 and the track grooves 35 of the inner race 36; and a cage 38 interposed between the radially inner surface 31 of the outer race 33 and the radially outer surface 34 of the inner race 36, for retaining the balls 37. A plurality of window portions 39 are provided in the cage 38 along a circumferential direction, the window portions 39 accommodating the balls 37. Note that, a tooth profile (serration or spline) 36a for articulating a shaft portion is formed in a radially inner surface of the inner race 36.

Each of the track grooves 32 of the outer race 33 includes a deep-side track groove 32a in which a ball center trace line in the track groove is drawn as a curved portion (arc-shaped portion), and an opening-side track groove 32b in which a ball center trace line in the track groove is drawn as a straight portion parallel to an axis of the outer race. Further, each of the track grooves 35 of the inner race 36 includes a deep-side track groove 35a in which a ball center trace line in the track groove is drawn as a straight portion parallel to an axis of the inner race, and an opening-side track groove 35b in which a ball center trace line in the track groove is drawn as a curved portion (arc-shaped portion).

Figure 3:
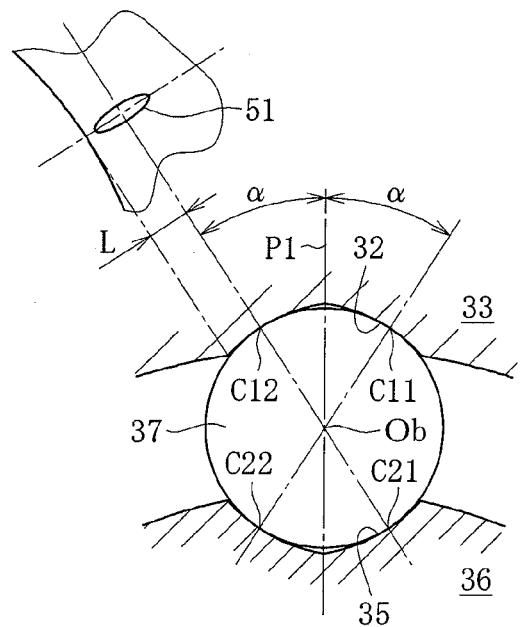
FIG. 3 is an explanatory diagram of shapes of track grooves of the fixed type constant velocity universal joint.

The track groove 32 of the outer race 33 and the track groove 35 of the inner race 36 are each molded into a Gothic arch shape by only a forging process, or by a cutting process or the like performed after the forging process. As illustrated in FIG. 3, owing to the Gothic arch shape, the track groove 32/35 and the ball 37 are held in angular contact with each other. That is, the ball 37 is shaped to be held in contact with the track groove 32 of the outer race 33 at two points C11 and C12, and with the track groove 35 of the inner race 36 at two points C21 and C22. Each angle formed between a center Ob of the ball 37, each of contact points C11, C12, C21, and C22 with the track grooves 32 and 35, and a line P1 passing the center Ob of the ball 37 and a joint center Oj is referred to as a contact angle α. The contact angles α of the contact points C11, C12, C21, and C22 are all set to be equal.

FIG. 1 and FIG. 2 illustrate a state in which an operating angle θ of the joint is 0°. In this state, an axis of the outer race 33 and an axis of the inner race 36 correspond to each other in a straight line X, and a plane P including the center Ob of each of all the torque transmission balls 37 is orthogonal to the straight line X. In the following, the straight line X and the plane P are respectively referred to as a joint center axis X and a joint center plane P, and an intersection between the joint center plane P and the joint center axis X is referred to as the joint center Oj.

As illustrated in FIG. 2, a center (center curvature) O2 of the deep-side track groove 32a of the track groove 32 of the outer race 33 is separated from the joint center plane P to a joint-opening side (right side of FIG. 2) by an axial distance F, and is offset to be positioned away from the joint center axis X to a radially opposite side relative to the track groove 32 by a radial distance fr. Further, a center O1 of the opening-side track groove 35b of the track groove 35 of the inner race 36 is separated from the joint center plane P to a joint-deep-portion side (left side of FIG. 2) by the axial distance F, and is offset to be positioned away from the joint center axis X to the radially opposite side relative to the track groove 35 by the radial distance fr.

In the following, the axial distances (F) between the center O2 of the track groove 32 and the joint center plane P and between the center O1 of the track groove 35 and the joint center plane P are referred to as axial offset amounts F, and the radial distances (fr) between the center curvature O2 and the joint center axis X and between the center curvature O1 and the joint center axis X are referred to as radial offset amounts fr. Note that, in this embodiment, the track groove 32 of the outer race 33 and the track groove 35 of the inner race 36 have equal axial offset amounts F and the equal radial offset amounts Fr.

Further, in this embodiment, both a center O4 of an outer spherical surface 38a of the cage 38 and a center O3 of an inner spherical surface 38b of the cage 38 are situated on the joint center Oj.

As illustrated in FIG. 1, when Rt represents a distance between the center (center curvature) O2 of the track groove 32 of the outer race 33 or the center (center curvature) O1 of the track groove 35 of the inner race 36 and the center Ob of the torque transmission ball 37 and F represents an axial distance (axial offset amount described above) between the center O2 of the track groove 32 of the outer race 33 or the center O1 of the track groove 35 of the inner race 36 and the joint center plane P, a ratio R1 (=F/Rt) between F and Rt is set to satisfy 0.061≤R1≤0.087. Thus, R1 can represent a value indicating a degree of offset (axial offset).

Further, when fr represents the radial offset amount as a distance between the center (center curvature) O2 of the track groove 32 of the outer race 33 or the center (center curvature) O1 of the track groove 35 of the inner race 36 and the joint center axis X, a ratio R3 (=fr/Rt) between fr and Rt is set to satisfy 0.07≤R3≤0.19. Thus, R3 can represent a value indicating a degree of offset (radial offset).

Figure 4:
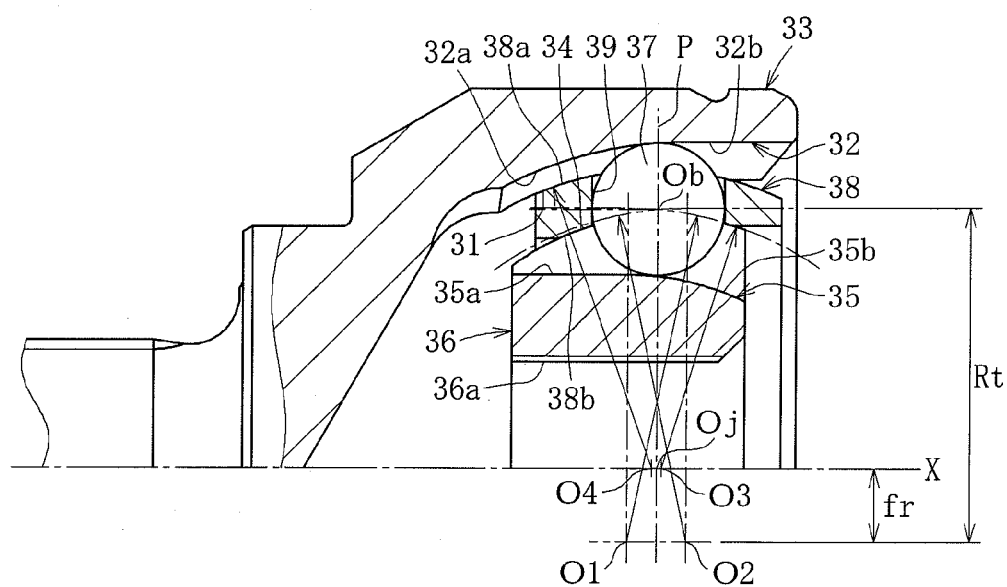
FIG. 4 is a sectional view of a fixed type constant velocity universal joint according to a second embodiment of the present invention.
Figure 5:
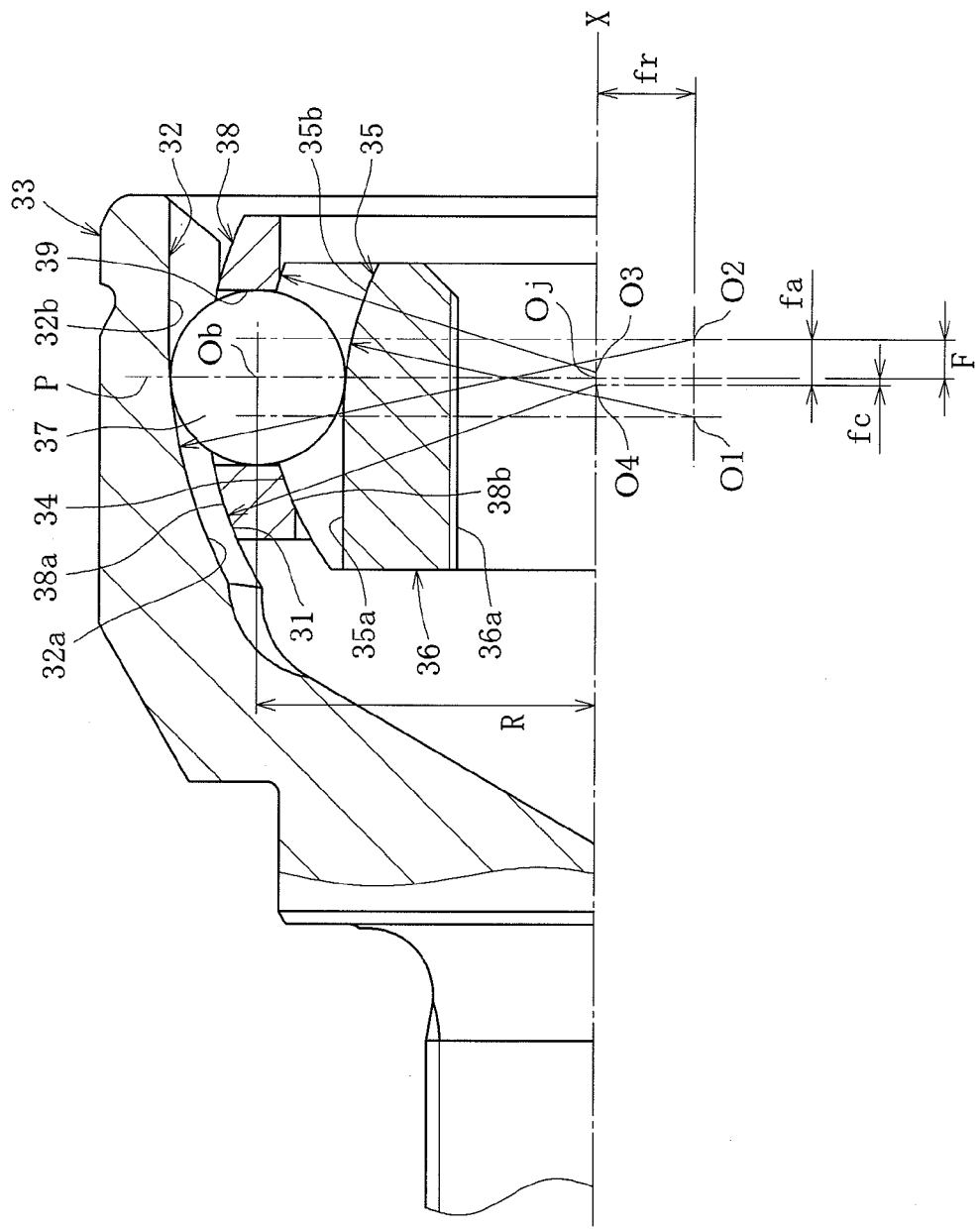
FIG. 5 is a sectional view of the fixed type constant velocity universal joint.

Next, FIG. 4 and FIG. 5 illustrate a second embodiment of the present invention. As illustrated in FIG. 5, the center O4 of the outer spherical surface of the cage 38 is arranged on the center O1 side of the track groove of the inner race 36 relative to the joint center Oj, and the center O3 of the inner spherical surface of the cage 38 is arranged on the center O2 side of the track groove of the outer race 33 relative to the joint center Oj. That is, each of the center O4 of the outer spherical surface of the cage 38 and the center O3 of the inner spherical surface of the cage 38 is offset from the joint center Oj in an axis direction by fc. Such a cage offset type joint is referred to as an opposite-track-direction cage offset type, in contrast to the joint referred to as a track-direction cage offset type illustrated in FIG. 14.

Also in this case, as illustrated in FIG. 5, the center (center curvature) O2 of the deep-side track groove 32a of the track groove 32 of the outer race 33 is separated from the joint center plane P to the joint-opening side by the axial distance F, and is offset to be positioned away from the joint center axis X to the radially opposite side relative to the track groove 32 by the radial distance fr. Further, the center O1 of the opening-side track groove 35b of the track groove 35 of the inner race 36 is separated from the joint center plane P to the joint-deep-portion side by the axial distance F, and is offset to be positioned away from the joint center axis X to the radially opposite side relative to the track groove 35 by the radial distance fr.

The ratio R1 (=F/Rt) between F and Rt is set to satisfy 0.044≤R1≤0.087, and the ratio R3 (=fr/Rt) between fr and Rt is set to satisfy 0.07≤R3≤0.19. Further, when fc represents an axial distance between the center O4 of the outer spherical surface of the cage 38 (center of the radially inner surface of the outer race 33) or the center O3 of the inner spherical surface of the cage 38 (center of the radially outer surface of the inner race 36) and the joint center plane P, and R represents a distance between the center Ob of the torque transmission ball 37 and the joint center axis X, a ratio R2 (=fc/R) between fc and R is set to be 0.01 or less. Note that, the other components of the fixed type constant velocity universal joint illustrated in FIG. 4 and FIG. 5 are the same as those of the fixed type constant velocity universal joint illustrated in FIG. 1 and FIG. 2, and hence description thereof is omitted.

As in the first embodiment and the second embodiment, in the structure offset in the radial direction, good operability is obtained even with an offset amount further smaller than that of a conventional product. This is because a shift amount of the inner race 36 from the joint center Oj, which is mainly caused by a gap, is smaller than that of the conventional product. The reason is as follows. The track grooves of the product of the present invention are positioned on the radially outer side relative to the joint center axis X in comparison with those of the conventional product, and hence positions of eight tracks at which track load is generated in a state of forming an operating angle are different between the conventional product and the developed product. Thus, due to a difference in positional relation of the balls supporting the inner race 36, a shift direction and the shift amount of the inner race 36 differ.

Figure 6:
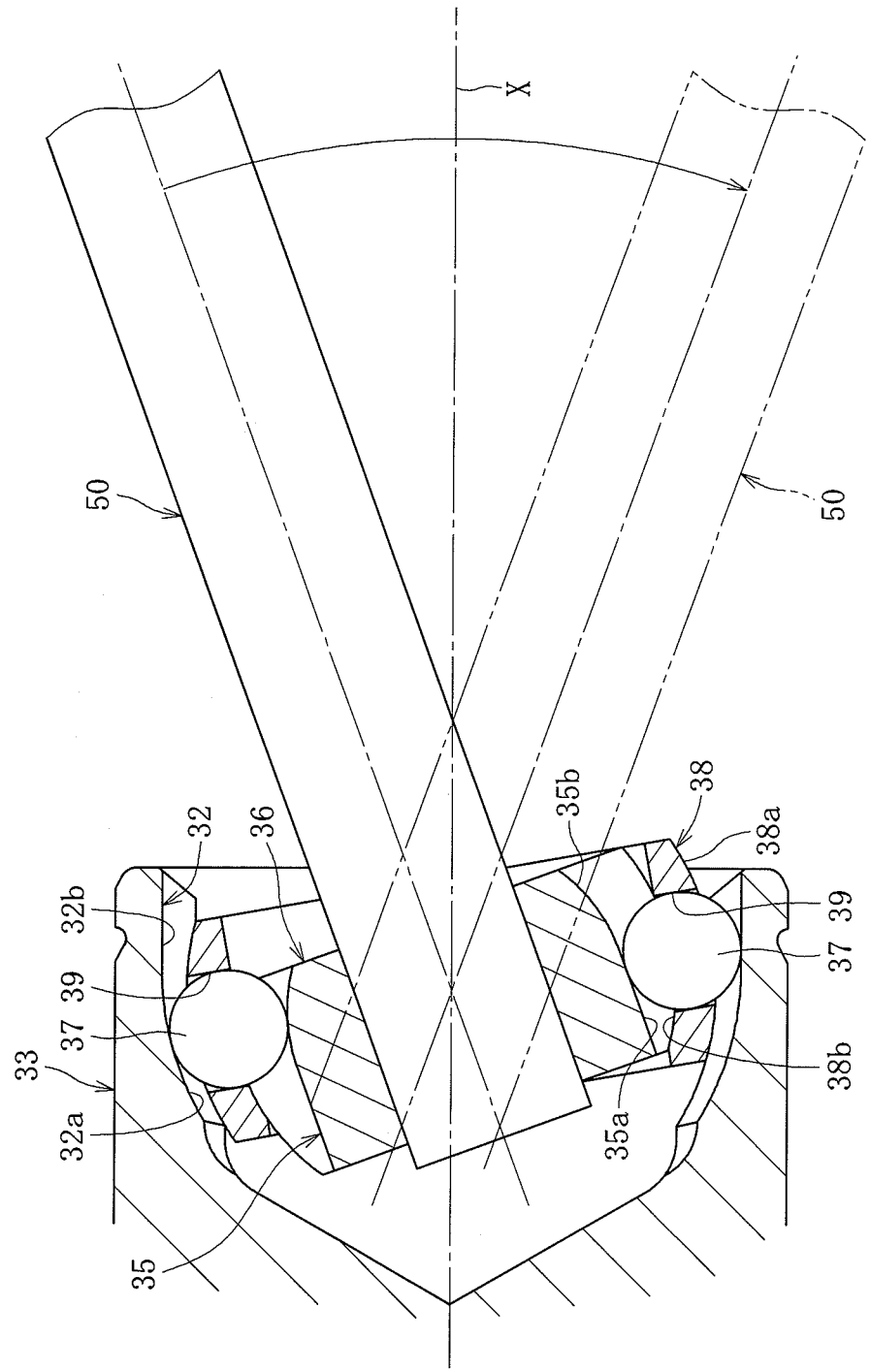
FIG. 6 is a sectional view illustrating a folded state.

Next, an optimum range of the ratio R1 (=F/Rt) is described. As illustrated in FIG. 6, a shaft is folded at an operating angle from −20° to +20° in an operating angle direction on the assumption that there is no torsion torque. That is, a folding resistance torque value in the operating angle direction at the time of folding is calculated with a mechanism analysis.

In this case, regarding inner gaps of the joint, amounts of gaps between the ball 37 and track groove 35 of the inner race 36 and between the ball 37 and the track groove 32 of the outer race 33 are set to be equal to an amount of a gap of an ordinary joint that is mass-produced as the fixed type constant velocity universal joint of this type. Note that, a gap between the inner spherical surface (radially inner surface) 31 of the outer race 33 and the outer spherical surface of the cage is set to be smaller than an actual gap, and a gap between the outer spherical surface (radially outer surface) 34 of the inner race 36 and the inner spherical surface 38b of the cage is set to have an amount larger than the amount of the ordinary gap. Further, a negative gap between the window portion 39 of the cage 38 and the ball 37 is also set to be smaller than an ordinary negative gap. That is, there is set such a condition that the folding resistance torque value in the operating angle direction is liable to occur and operability is deteriorated.

Figure 7:
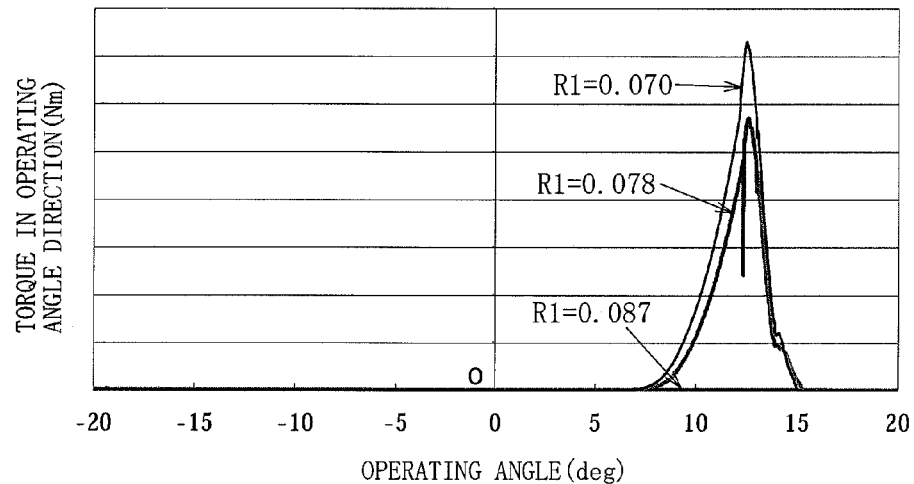
FIG. 7 is a graph showing a relation between an operating angle and torque in an operation angle direction.

FIG. 7 shows the analysis result of eight balls (which are cage-offset in a track center direction) in a conventional structure that is not offset in the radial direction. In FIG. 7, a narrow line indicates a case where R1 is 0.070, a wide line indicates a case where R1 is 0.078, and a medium line indicates a case where R1 is 0.087. As can be seen from FIG. 7, in the case where R1 is 0.070, and in the case where R1 is 0.078, the torque value increases from a vicinity of the operating angle of +7.5°, and a peak value is found at the operating angle of +13°. Further, from the analysis result, when the value of R1 is 0.087, no torque is generated so that smooth operation is achieved. As the value of R1 decreases, the folding resistance torque increases. That is, in the conventional product having the gap under this analysis condition, good operability is obtained when the value of R1 is 0.087 or more, whereas operability is deteriorated when the value of R1 is less than 0.087.

Figure 8:
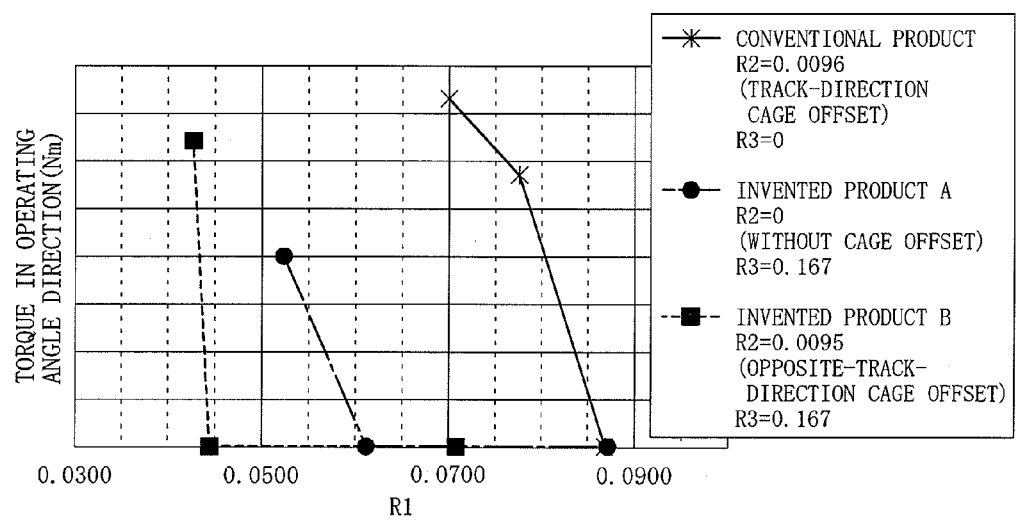
FIG. 8 is a graph showing a relation between R1 and the torque in the operation angle direction.
Figure 14:
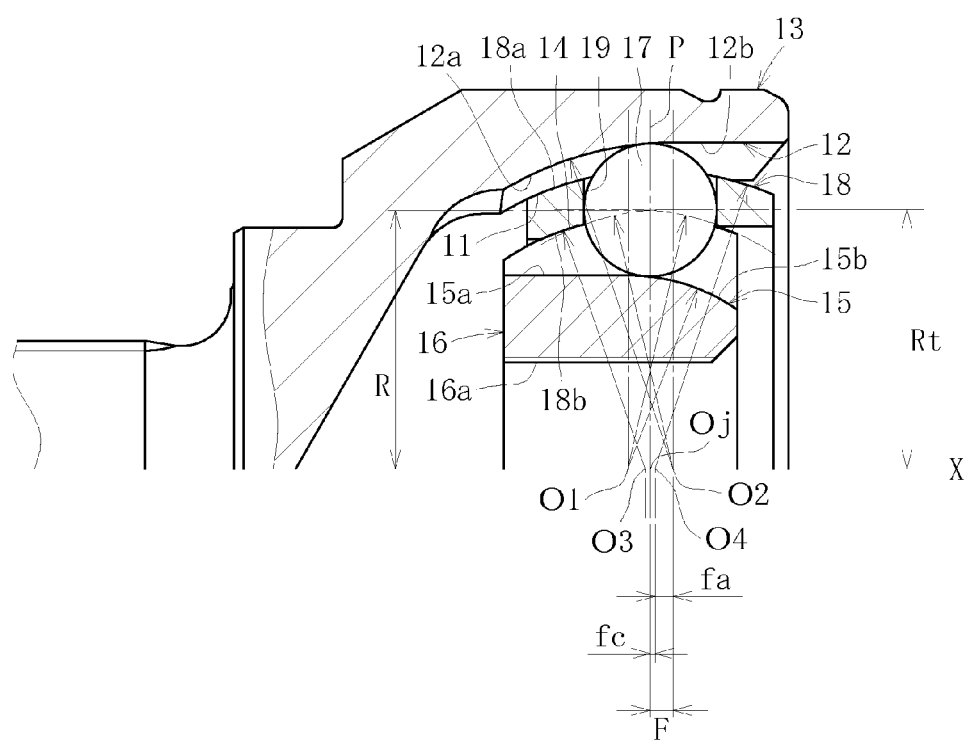
FIG. 14 is a sectional view of a conventional fixed type constant velocity universal joint of an undercut-free type.

Next, FIG. 8 shows the result of a case where, in the product of the present invention, the value of R1 is varied under the same gap condition and a maximum torque value with respect to the value of R1 is compared with that of the conventional product based on the analysis. In FIG. 8, a solid line indicates the conventional product (having a cage offset shape and track grooves that are not offset in the radial direction), a chain line indicates the product of the present invention illustrated in FIG. 1 (referred to as invented product A), and a broken line indicates the product of the present invention illustrated in FIG. 4 (referred to as invented product B). As illustrated in FIG. 14, the conventional product is of the track-direction cage offset type, in which R2=0.0096 and R3=0. Further, as illustrated in FIG. 1, the invented product A is of a type without cage offset, in which R2=0 and R3=0.167. As illustrated in FIG. 4, the invented product B is of the opposite-track-direction cage offset type, in which R2=0.0095 and R3=0.167.

As described above, in the structure of the product of the present invention, which is offset in the radial direction, good operability is obtained even with an offset amount further smaller than that of the conventional product. This is because the shift amount of the inner race of the developed product from the joint center, which is mainly caused by a gap, is smaller than that of the conventional product. The reason is as follows. The tracks of the product of the present invention are positioned on the radially outer side relative to the center axis in comparison with those of the conventional product, and hence positions of eight tracks at which track load is generated in a state of forming an operating angle are different between the conventional product and the developed product. That is, due to the difference in positional relation of the balls supporting the inner race, the shift direction and the shift amount of the inner race differ.

From the analysis result, it is found that good operability is obtained even with the smaller value of R1 in a type B (invented product B) than in a type A (invented product A). In the invented product A, good operability can be obtained when the value of R1 is 0.061 or more. In the invented product B, good operability can be obtained when the value of R1 is 0.045 or more.

Figure 9:
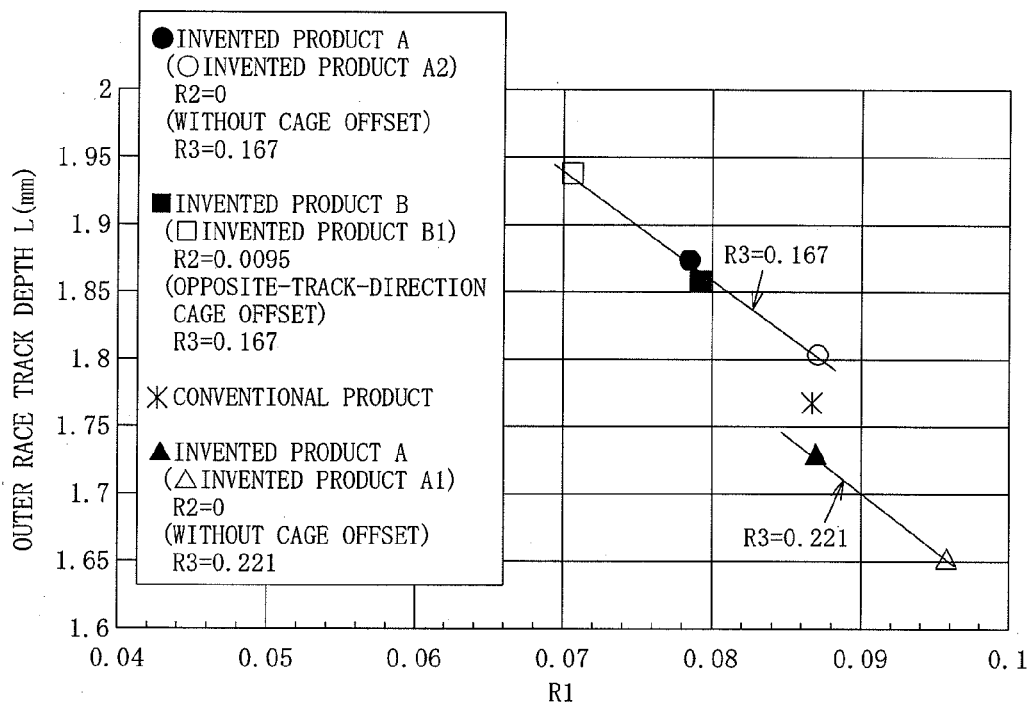
FIG. 9 is a graph showing a relation between R1 and a track depth of an outer race.
Figure 10:
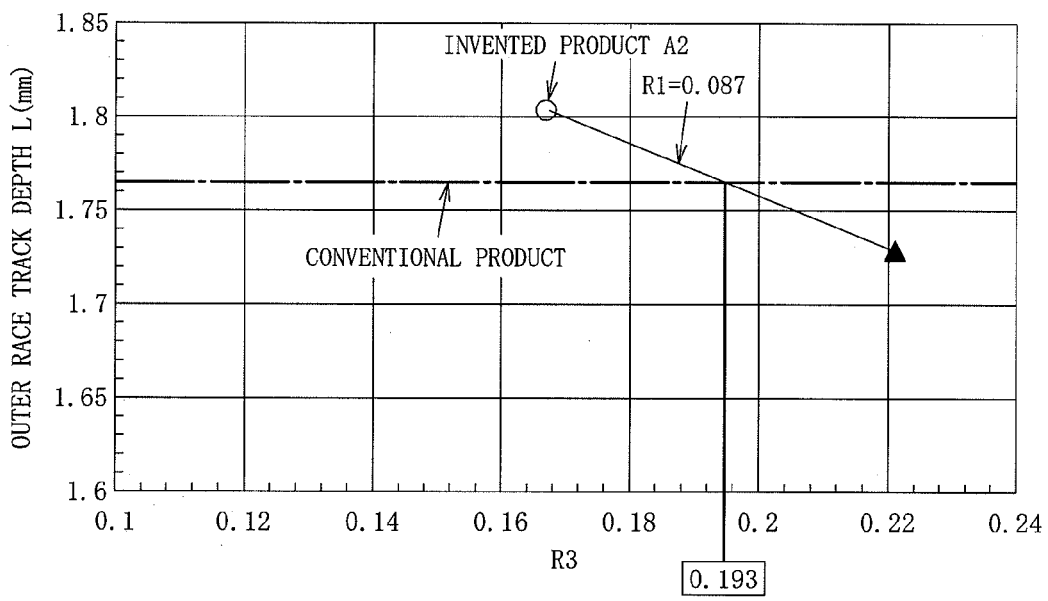
FIG. 10 is a graph showing a relation between R3 and the track depth of the outer race.

Next, FIG. 9 and FIG. 10 show values of a track depth of the outer race 33 under a condition of durability test at a normal angle(6°). FIG. 9 shows a relation between R1 and the track depth of the outer race 33. In FIG. 9, ● represents the type A without cage offset, in which R2=0 and R3=0.167. In particular, ○ represents a type (i.e., type A2), in which R1=0.087. ■ represents the type B of the opposite-track-direction cage offset, in which R2=0.0095 and R3=0.167. In particular, □ represents a type in which R1=0.071. ▲ represents the type A without cage offset, in which R2=0 and R3=0.221. In particular, △ represents a type (i.e., type A1), in which R1=0.096. In FIG. 9, * represents the conventional product. In the conventional product, R1=0.087, R2=0.0096, and R3=0.

FIG. 10 shows a relation between R3 and the track depth of the outer race 33. In FIG. 10, ○ represents the type A2, in which R3=0.167, R1=0.087, and R2=0. ▲ represents the type A, in which R3=0.221, R1=0.087, and R2=0.

At the normal angle(6°), as the value of R1 becomes smaller, the track depth becomes deeper. Further, as the value of R3 becomes smaller, the track depth becomes deeper. Note that, the type B (cage offset product) is advantageous because the type B can adopt the small value of R1. Here, the track depth is referred to as a distance L (see FIG. 3) between a spherical surface and a ball contact point at which a contact ellipse 51 of the ball is closest to the spherical surface when analysis of the joint internal force is performed in a rotating state under the durability condition at the normal angle (operating angle 6°) with high torque, the ball moving in the track during one rotation in the axial direction and the contact angle α direction.

In the durability test at the normal angle, in particular, in the test with high torque, due to high load applied onto the track, the contact ellipse 51 of the ball is increased, and the contact ellipse 51 extends into the radially inner surface of the outer race 33 so that peeling occurs from edge load. In view of improvement of durability, as the distance L between the ball contact point and the spherical surface portion is increased, the durability is improved.

Figure 11:
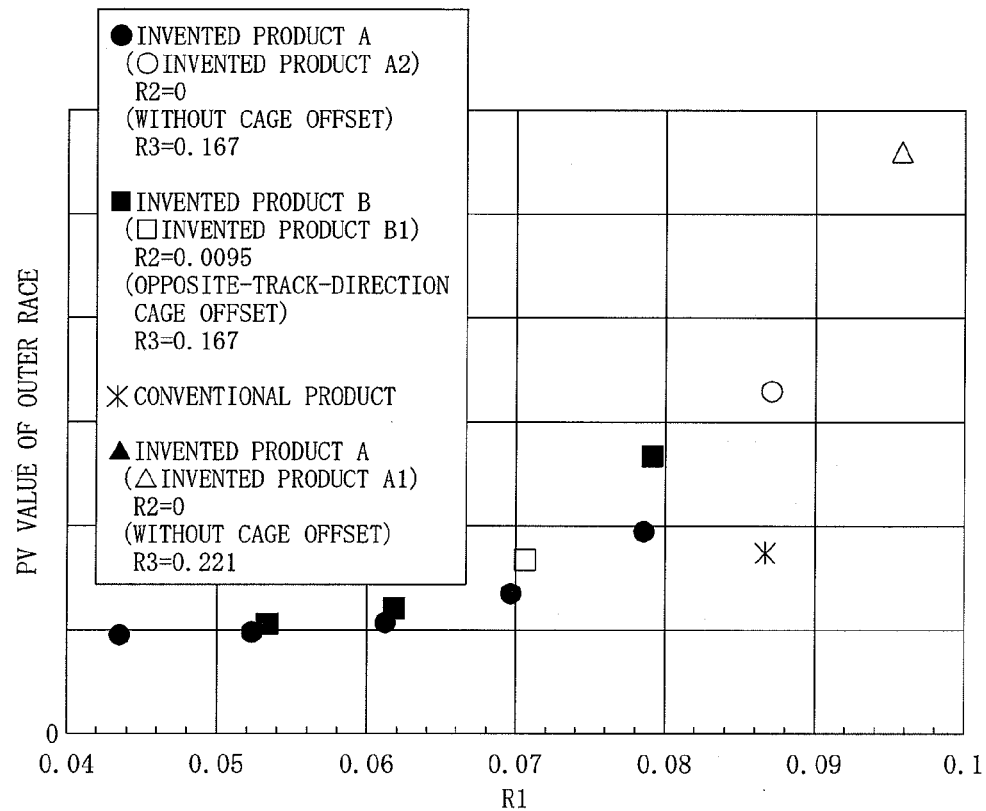
FIG. 11 is a graph showing a relation between R1 and a PV value of the outer race.

Next, FIG. 11 shows PV values of the outer race obtained from the analysis results under the condition of durability test at the normal angle(6°). The PV value is obtained by multiplying sliding speed between the ball and the track by the track load. As the PV value becomes smaller, the durability is improved. From the analysis results, as the value of R1 becomes smaller, the PV value becomes smaller. However, when the value of R1 is 0.071 or less, a decrease in the PV value is slow. Note that, the type B (cage offset product) is advantageous because the type B can adopt the small value of R1. Further, in contrast to the outer race, the inner race 36 has such a relation that the PV value of the inner race 36 becomes larger as the value of R1 becomes smaller. Therefore, there is a fear in that the increase in the PV value of the inner race 36 causes a reduction of the durability of the inner race. When the value of R1 is 0.071, a defect of the inner race is not found. Note that, the invented products represented by ■, □, ▲, △, ●, and ○ in FIG. 11 respectively correspond to the fixed type constant velocity universal joints of the same types as those represented by ■, □, ▲, △, ●, and ○ in FIG. 9.

Figure 12:
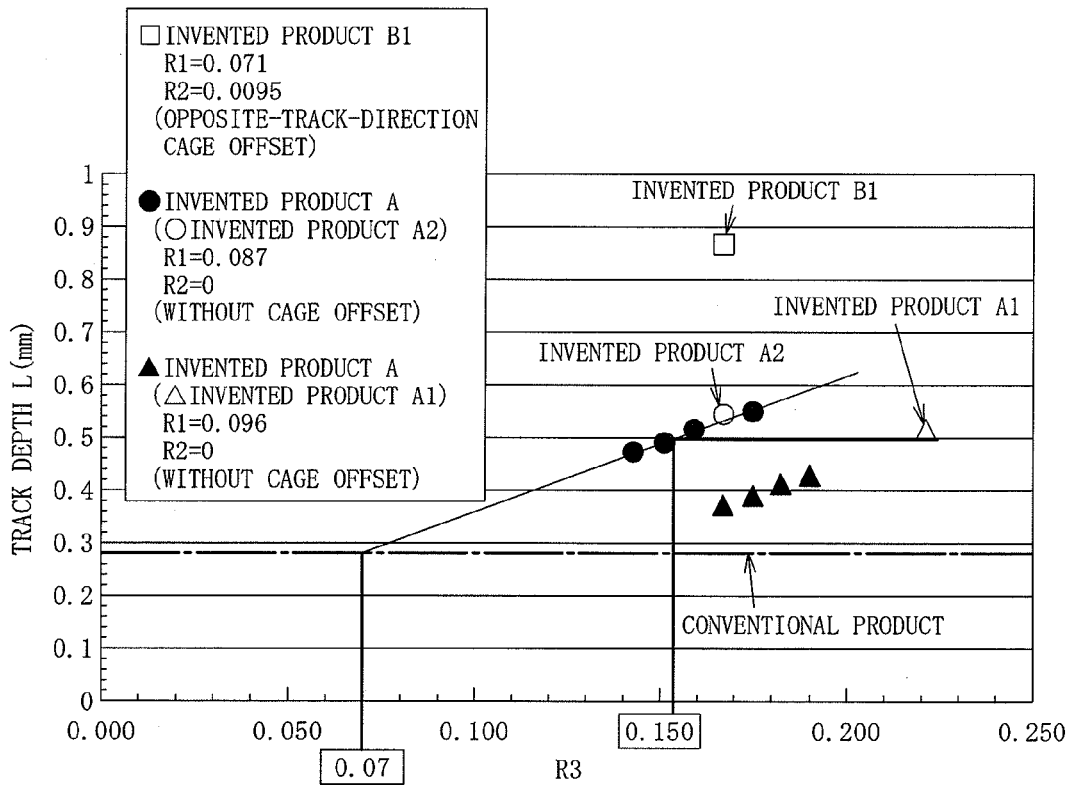
FIG. 12 is a graph showing a relation between R3 and the track depth.
Figure 13:
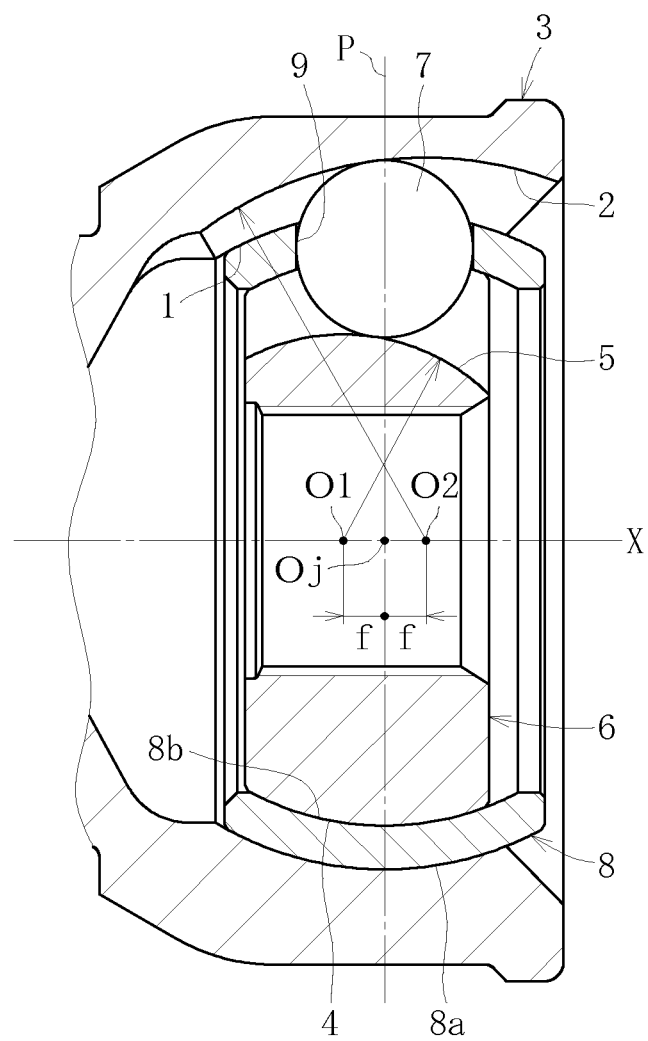
FIG. 13 is a sectional view of a fixed type constant velocity universal joint of a Rzeppa type.

Next, FIG. 12 shows track depths obtained from the analysis results when torque of 250 Nm is applied at the operating angle of 46°. In FIG. 12, □ represents the type B of the opposite-track-direction cage offset (i.e., type B1), in which R1=0.071, R2=0.0095, and R3=0.167. ● represents the type A without cage offset, in which R1=0.087 and R2=0. In particular, ○ represents the type (i.e., type A2), in which R3=0.167. ▲ represents the type A without cage offset, in which R1=0.096 and R2=0. In particular, △ represents the type (i.e., type A1), in which R3=0.221.

As described above, at the operating angle of 46°, as the value of R3 becomes larger, the track depth becomes deeper. Further, as the value of R1 becomes smaller, the track depth becomes deeper. When the value of R1 is 0.087, the same depth as that of the conventional product is obtained when the value of R3 is 0.07.

Note that, Table 1 shows values of R1, R2, and R3 of the conventional product and the invented products of different types, and kinds of cage offset. Further, the values of R1, R2, and R3 in the conventional product also correspond to the ratio R1 (=F/Rt), the ratio R2 (=fc/R), and the ratio R3 (=fr/Rt), respectively.

TABLE 1

|  |  | Conventional product | Invented product | | |
|---|---|---|---|---|---|
|  |  |  | Type A of invented product | | Type B of invented product |
|  |  |  | A1 | A2 | B1 |
| Offset | R1 | 0.087 | 0.096 | 0.087 | 0.071 |
| Cage offset | R2 | 0.0096 | 0 | 0 | 0.0095 |
|  | Direction: position of track center and position of spherical surface center with respect to joint center |  | Same direction | | Opposite direction |
| Radial offset | R3 | 0 | 0.221 | 0.167 | 0.167 |

As shown in FIG. 7 to FIG. 12, a preferred range of R1 is from 0.061 to 0.087 in the type A, and from 0.044 to 0.087 in the type B. As shown in FIG. 8, the lower limit value in this case corresponds to the limit value in operability. The upper limit value is within a range in which it is possible to ensure a result of the durability test at the normal angle described below and the track depth more than in the conventional product. In particular, a more preferred range of R1 is from 0.061 to 0.071 in the type A, and from 0.044 to 0.071 in the type B. This range corresponds to the range in which the PV value is equal to or less than that of the conventional product as shown in FIG. 11. With setting of this upper limit range, the track depth is further increased, and hence the durability is further improved.

It is preferred that R2 be 0.01 or less. This is because, when R2 exceeds 0.01, there is a fear in that a thickness of the opening side (joint-opening side) of the cage 38 is reduced and strength is reduced.

It is preferred that R3 be from 0.07 to 0.19. That is, as shown in FIG. 12, when the value of R1 is 0.087 within the preferred range, R3 is set to be 0.07 or more within the range in which it is possible to ensure the track depth with a size equivalent to that of the conventional product. Further, based on the track depth in durability test at a normal angle described below, R3 is set to be 0.19 or less within the range in which it is possible to ensure the track depth with a size equivalent to that of the conventional product (see FIG. 10). In particular, it is more preferred that R3 be set from 0.15 to 0.19. 0.15 corresponds to the value of R3 when a level of the track depth of the invented product A1 shown in FIG. 12 is R1=0.087.

According to the present invention, owing to provision of radial offset at the center (center curvature of the curved portion) of the track groove 32 of the outer race 33, when compared to a case where the radial offset is not provided, the groove depth on the joint-deep-portion side of the track groove 32 is relatively increased. Thus, rigidity of a side wall portion of the joint deep portion of the track groove 32 is increased. Accordingly, when the joint takes a high operating angle and the torque transmission ball 37 transmits torque at a position close to the joint-deep-portion side of the track groove 32, deformation of an edge portion of the side wall portion of the joint deep portion of the track groove 32 is suppressed, and hence torsional strength of the joint in a high operating angle range is increased. Further, torque capacity in the high operating angle range is increased. Here, the torque capacity is referred to as torque in which an edge portion of the contact ellipse serving as a contact portion between the torque transmission ball 37 and the track groove 32 overlaps an edge line of the track groove 32 when the joint transmits torque while taking a certain operating angle.

As described above, in the present invention, the torque capacity on the deep side of the outer race is increased at the time of high operating angle. Thus, rigidity of a wall surface of the track groove is increased, deformation of the edge portion of the track is suppressed, and the torsional strength is increased. The track depth on the deep side of the outer race is increased at the time of high operating angle. Thus, climbing torque is increased, the edge load is reduced, and the durability at the high operating angle is improved. At the normal angle, the track depth with a size equivalent to that of the conventional product can be ensured, and the durability is equivalent to or more than that of the conventional product. In particular, when R1 is equal to or less than 0.071, the track depth becomes deeper, and the PV value is reduced. As a result, the durability is improved. As described above, the fixed type constant velocity universal joint can meet demand for high durability, and hence it is possible to achieve a reduction in size, weight, and cost. Further, when R1 is equal to or less than 0.087 to be smaller than a value of the conventional product, load in the axial direction from the ball 37 to the cage 38, and a radial movement amount of the ball 37 are reduced, for example. Accordingly, efficiency is improved. Therefore, the fixed type constant velocity universal joint according to the present invention is most suitable for a drive shaft of an automobile.

The embodiments of the present invention are described above. The present invention is not limited to the embodiments, and various modifications may be made. For example, the axial offset amount, the radial offset amount, the cage offset amount, and the like can be arbitrarily set within the ranges in which R1, R2, and R3 are the above-mentioned optimum values. Further, the improvement of the operability due to the radial offset enables the value of R1 to be set small. Therefore, the center O4 of the outer spherical surface of the cage 38 may be arranged on the center O2 side of the track groove 32 of the outer race 33 relative to the joint center Oj, and the center O3 of the inner spherical surface of the cage 38 may be arranged on the center O1 side of the track groove 35 of the inner race 36 relative to the joint center Oj. The fixed type constant velocity universal joint according to the present invention is not limited in use to a drive shaft, but may be used to a propeller shaft and a power transmission system of other various industrial machines. Note that, in the fixed type constant velocity universal joint illustrated in FIG. 1, or the fixed type constant velocity universal joint illustrated in FIG. 4, the curved portion of each of the track grooves 32 and 35 is formed by a single arc, but may be formed by a plurality of arcs. When the curved portion is formed by the single arc, processing is easy, and hence there is an advantage of low manufacturing cost.

EXAMPLES

Example 1

A durability test was performed at a normal angle (operating angle 6°) under a condition of high torque. The results are shown in Table 2 below. In this case, two samples of conventional products (as conventional product No. 1 and conventional product No. 2) were prepared, and two samples of the invented products A1 (as invented product A1 No. 1 and invented product A1 No. 2) were prepared. Four samples of the invented products A2 and four samples of the invented products B (as invented product A2 No. 1, invented product A2 No. 2, invented product A2 No. 3, invented product A2 No. 4, invented product B1 No. 1, invented product B1 No. 2, invented product B1 No. 3, and invented product B1 No. 4) were prepared. The durability test was performed in torque of 834 Nm and at rotational speed of 230 r/min.

TABLE 2

| Sample specification | Sample No. | Operation time | Damage condition |
|---|---|---|---|
| Conventional product | No. 1 | -------->Δ | Inner race |
|  | No. 2 | -------->Δ | Inner race |
| Invented product A1 | No. 1 | -------->○-------->X | Outer race, Ball |
|  | No. 2 | -------->○-------->X | Outer race, Ball |
| Invented product A2 | No. 1 | -------->○-------->Δ | Outer race |
|  | No. 2 | -------->○-------->○ |  |
|  | No. 3 | -------->○-------->Δ | Outer race |
|  | No. 4 | -------->○-------->Δ | Outer race |
| Invented product B1 | No. 1 | -------->○-------->○ |  |
|  | No. 2 | -------->○-------->○ |  |
|  | No. 3 | -------->○-------->○ |  |
|  | No. 4 | -------->○-------->○ |  |

In Table 2, Δ represents a state in which continuing operation is possible even after a defect occurs, and x represents a state in which continuing operation is impossible because a defect is large. When the operation was being performed for 138 hours, the defect (defect allowing continuing operation), i.e., damage of the inner race occurred in the conventional product No. 1 and the conventional product No. 2, whereas no such defect occurred in the invented products. Further, when the operation was being performed for 276 hours, such large defects occurred in the outer race and the ball of the invented product A1 No. 1 that continuing operation was impossible, and such a large defect occurred in the ball of the invented product A1 No. 2 that continuing operation was impossible. Further, when the operation was being performed for 276 hours, the defect (defect allowing continuing operation), i.e., damage of the outer race occurred in the invented product A2 No. 1, the invented product A2 No. 3, and the invented product A2 No. 4. Note that, the track depths obtained from the analysis of the invented products support the graphs of FIG. 9 and FIG. 10, and support the PV values shown in FIG. 11.

As described above, the defect occurred from the inner race in the conventional product, whereas no defect occurred in the inner race in the invented product. The reason is as follows. The invented product is offset in the radial direction, and hence a radius of the arc-shaped portion of the inner race is large so that a principal curvature of the track is large. Thus, surface pressure is reduced. In the invented product, similarly to the analysis results of the track depth and PV, regarding the defect occurring in the outer race, it was confirmed that the durability is improved as the track depth becomes deeper and the PV value becomes smaller. It is found that the invented product is more satisfactory than the conventional product in durability.

Example 2

Next, a durability test was performed at a high angle. The results are shown in Table 3 below. In this case, two samples of conventional products (as conventional product No. 1 and conventional product No. 2) were prepared, and two samples of the invented products A1, two samples of the invented products A2, and two samples of the invented products B (as invented product A1 No. 1, invented product A1 No. 2, invented product A2 No. 1, invented product A2 No. 2, invented product B1 No. 1, and invented product B1 No. 2) were prepared. The durability test was performed in torque of 549 Nm and at an angle of 0 to 46° (swing) and rotational speed of 80 r/min.

TABLE 3

| Sample specification | Sample No. | Operation time | Damage condition |
|---|---|---|---|
| Conventional product | No. 1 | —— →Δ | Track chip on deep side of outer race |
|  | No. 2 | —— →Δ | Track chip on deep side of outer race |
| Invented product A1 | No. 1 | —— —— —— →Δ | Track chip on deep side of outer race |
|  | No. 2 | —— —— —— →Δ | Track chip on deep side of outer race |
| Invented product A2 | No. 1 | —— —— —— —— —— —— —— —— →Δ | Track chip on deep side of outer race |
|  | No. 2 | —— —— —— —— —— —— —— —— →Δ | Track chip on deep side of outer race |
| Invented product B1 | No. 1 | —— —— —— —— —— —— —— —— —— →o |  |
|  | No. 2 | —— —— —— —— —— —— —— —— —— →o |  |

When the operation was being performed for 3.7 hours, a defect caused by a track chip occurred on the deep side of the outer race in the conventional product No. 1 and the conventional product No. 2. When the operation was being performed for 7.4 hours, the defect caused by the track chip occurred on the deep side of the outer race in the invented product A1 No. 1 and the invented product A1 No. 2. When the operation was being performed for 14.8 hours, the defect caused by the track chip occurred on the deep side of the outer race in the invented product A2 No. 1 and the invented product A2 No. 2. Even when the operation was being performed for over 18.5 hours, no defect occurred in the invented product B1 No. 1 and the invented product B1 No. 2. As described above, it is found that the invented products are improved in durability in comparison with the conventional products. In particular, the invented products B1 are excellent.

The fixed type constant velocity universal joint according to the present invention is not limited in use to a drive shaft, but may be used with a propeller shaft and a power transmission system of other various industrial machines. The curved portion of the track groove may be constituted by a single arc, or may be constituted by a plurality of arcs. When the curved portion is constituted by the single arc, processing is easy, and hence there is an advantage of low manufacturing cost.

The invention claimed is:

1. A fixed type constant velocity universal joint, comprising:
    an outer joint member having a radially inner surface in which eight track grooves extending in an axial direction are formed;
    an inner joint member having a radially outer surface in which eight track grooves extending in the axial direction are formed;
    eight torque-transmission-ball tracks formed by the track grooves of the outer joint member and the track grooves of the inner joint member in correspondence with the track grooves of the outer joint member;
    eight torque transmission balls arranged in the torque-transmission-ball tracks, respectively; and
    a cage including pockets for retaining the torque transmission balls,
    wherein the fixed type constant velocity universal joint is an undercut-free type including a curved portion and a straight portion which are both provided on a bottom surface of each of the track grooves of the outer joint member and a bottom surface of each of the track grooves of the inner joint member,
    wherein under a state in which an operating angle of the joint is 0°, when a straight line including an axis of the outer joint member and an axis of the inner joint member is referred to as a joint center axis and a plane including a center of each of the torque transmission balls and being orthogonal to the joint center axis is referred to as a joint center plane, a center of curvature of each of the track grooves of the outer joint member and a center of curvature of each of the track grooves of the inner joint member (a) are respectively spaced from the joint center plane on both sides thereof in the axial direction and (b) are offset so as to be positioned away from the joint center axis on a radially opposite side thereof relative to the track grooves, and wherein a center of an outer spherical surface of the cage and a center of an inner spherical surface of the cage correspond to each other, and
    wherein in a case where Rt represents a distance between the center of each of the torque transmission balls and the center of curvature of each of the track grooves of the outer joint member or the center of curvature of each of the track grooves of the inner joint member, and F represents an axial distance between the joint center plane and the center of curvature of each of the track grooves of the outer joint member or the center of curvature of each of the track grooves of the inner joint member, a ratio $R1=F/Rt$ is set to satisfy $0.044 \leq R1 \leq 0.071$, and, wherein in a case where fr represents a radial offset amount as a distance between the joint center axis and the center of curvature of each of the track grooves of the outer joint member or the center of curvature of each of the track grooves of the inner joint member, a ratio $R3=fr/Rt$ is set to satisfy $0.07 \leq R3 \leq 0.19$, whereby the ratio R1 and the ratio R3 are set to values that ensure durability at normal angles and improve torque capacity at a high operating angle.

2. A fixed type constant velocity universal joint according to claim 1, wherein the curved portion of the bottom surface of each of the track grooves of the outer joint member is formed by a single arc, and the curved portion of each of the track grooves of the inner joint member is formed by a single arc.

3. A fixed type constant velocity universal joint according to claim 2, wherein the ratio $R3=fr/Rt$ is set to be $0.15 \leq R3 \leq 0.19$.

4. A fixed type constant velocity universal joint according to claim 2, used in articulating of a drive shaft of an automobile.

5. A fixed type constant velocity universal joint according to claim 1, wherein the ratio $R3=fr/Rt$ is set to be $0.15 \leq R3 \leq 0.19$.

6. A fixed type constant velocity universal joint according to claim 1, used in articulating of a drive shaft of an automobile.

7. A fixed type constant velocity universal joint, comprising:
    an outer joint member having a radially inner surface in which eight track grooves extending in an axial direction are formed;
    an inner joint member having a radially outer surface in which eight track grooves extending in the axial direction are formed;
    eight torque-transmission-ball tracks formed by the track grooves of the outer joint member and the track grooves of the inner joint member in correspondence with the track grooves of the outer joint member;
    eight torque transmission balls arranged in the torque-transmission-ball tracks, respectively; and
    a cage including pockets for retaining the torque transmission balls,
    wherein the fixed type constant velocity universal joint is an undercut-free type including a curved portion and a straight portion which are both provided on a bottom surface of each of the track grooves of the outer joint member and a bottom surface of each of the track grooves of the inner joint member,
    wherein under a state in which an operating angle of the joint is 0°, when a straight line including an axis of the outer joint member and an axis of the inner joint member is referred to as a joint center axis and a plane including a center of each of the torque transmission balls and being orthogonal to the joint center axis is referred to as a joint center plane, a center of curvature of each of the track grooves of the outer joint member and a center of curvature of each of the track grooves of the inner joint member (a) are respectively spaced from the joint center plane on both sides thereof in the axial direction and (b) are offset so as to be positioned away from the joint center axis on a radially opposite side thereof relative to the track grooves;
    wherein in a case where a center of curvature of an outer spherical surface of the cage is arranged on the side of the center of curvature of the track groove of the inner joint member relative to the joint center plane and a center of curvature of an inner spherical surface of the cage is arranged on the side of the center of curvature of the track groove of the outer joint member relative to the joint center plane, fc represents an axial distance between the joint center plane and the center of curvature of the outer spherical surface of the cage or the center of curvature of the inner spherical surface of the cage, R represents a distance between the center of each of the torque transmission balls and the joint center axis, and a ratio $R2=fc/R$ is set to be 0.01 or less, whereby the ratio R2 is set to a value that ensures thickness on an opening side of the cage; and wherein Rt represents a distance between the center of each of the torque transmission balls and the center of curvature of each of the track grooves of the outer joint member or the center of curvature of each of the track grooves of the inner joint member, and F represents an axial distance between the joint center plane and the center of curvature of each of the track grooves of the outer joint member or the center of curvature of each of the track grooves of the inner joint member, a ratio R1=F/Rt is set to satisfy $0.044 \leq R1 \leq 0.071$, fr represents a radial offset amount as a distance between the joint center axis and the center of curvature of each of the track grooves of the outer joint member or the center of curvature of each of the track grooves of the inner joint member, and a ratio R3=fr/Rt is set to satisfy $0.07 \leq R3 \leq 0.19$, whereby the ratio R1 and the ratio R3 are set to values that ensure durability at all operating angles and improve torque capacity at a high operating angle.

8. A fixed type constant velocity universal joint according to claim 7, wherein the curved portion of the bottom surface of each of the track grooves of the outer joint member is formed by a single arc, and the curved portion of each of the track grooves of the inner joint member is formed by a single arc.

9. A fixed type constant velocity universal joint according to claim 8, wherein the ratio R3=fr/Rt is set to be $0.15 \leq R3 \leq 0.19$.

10. A fixed type constant velocity universal joint according to claim 7, wherein the ratio R3=fr/Rt is set to be $0.15 \leq R3 \leq 0.19$.

11. A fixed type constant velocity universal joint according to claim 7, used in articulating of a drive shaft of an automobile.

* * * * *